United States Patent
Osuki

(10) Patent No.: US 10,461,989 B2
(45) Date of Patent: Oct. 29, 2019

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Takashi Osuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/590,299

(22) Filed: May 9, 2017

(65) Prior Publication Data

US 2017/0244591 A1 Aug. 24, 2017

Related U.S. Application Data

(63) Continuation of application No. 12/971,445, filed on Dec. 17, 2010, now Pat. No. 9,742,931.

(30) Foreign Application Priority Data

Dec. 21, 2009 (JP) ................................ 2009-288826

(51) Int. Cl.
*G06F 16/16* (2019.01)
*H04L 12/24* (2006.01)
(Continued)

(52) U.S. Cl.
CPC ....... *H04L 41/0253* (2013.01); *G06Q 10/107* (2013.01); *H04L 67/02* (2013.01);
(Continued)

(58) Field of Classification Search
CPC ... H04L 4/10253; H04L 67/02; H04L 67/125; G06Q 10/107
(Continued)

(56) References Cited

U.S. PATENT DOCUMENTS

2001/0029521 A1 10/2001 Matsuda et al.
2002/0004802 A1 1/2002 Shima
(Continued)

FOREIGN PATENT DOCUMENTS

EP 1467517 A2 10/2004
JP 2002-007095 A 1/2002
(Continued)

OTHER PUBLICATIONS

Office Action issued in corresponding European Application No. 10191696.3 dated Apr. 19, 2017.
(Continued)

*Primary Examiner* — Alan S Chou
(74) *Attorney, Agent, or Firm* — Carter, DeLuca & Farrell LLP

(57) ABSTRACT

An information processing apparatus includes a display control unit, a generation unit, and a notification unit. The display control unit displays a device for executing a particular function on a display device. The displayed device includes separate webpages and the separate webpages include a webpage for setting to make the particular function usable. In response to a user selecting the device displayed on the display device, the generation unit generates a uniform resource locator (URL). The generated URL represents the webpage for setting to make the particular function usable. The notification unit notifies the URL generated by the generation unit to a web browser included in the information processing apparatus.

32 Claims, 8 Drawing Sheets

(51) Int. Cl.

| | | |
|---|---|---|
| *H04N 1/00* | (2006.01) | |
| *H04N 1/32* | (2006.01) | |
| *H04L 29/08* | (2006.01) | |
| *G06Q 10/10* | (2012.01) | |
| *G06F 3/01* | (2006.01) | |
| *G06F 11/07* | (2006.01) | |

(52) U.S. Cl.
CPC .......... *H04L 67/125* (2013.01); *H04L 67/146* (2013.01); *H04N 1/0035* (2013.01); *H04N 1/00204* (2013.01); *H04N 1/00278* (2013.01); *H04N 1/00307* (2013.01); *H04N 1/00347* (2013.01); *H04N 1/32502* (2013.01); *H04N 1/32614* (2013.01); *G06F 3/01* (2013.01); *G06F 11/07* (2013.01); *H04N 1/00* (2013.01)

(58) Field of Classification Search
USPC ........................................................ 709/206
See application file for complete search history.

(56) References Cited

U.S. PATENT DOCUMENTS

| | | |
|---|---|---|
| 2003/0200269 A1 | 10/2003 | Maehara et al. |
| 2005/0136909 A1* | 6/2005 | Eguchi ................ H04L 61/2015 455/420 |
| 2005/0248805 A1 | 11/2005 | Shima |
| 2006/0293916 A1 | 12/2006 | Somberg |
| 2006/0294196 A1 | 12/2006 | Feirouz et al. |
| 2007/0058194 A1 | 3/2007 | Itoh et al. |
| 2007/0067329 A1 | 3/2007 | Kamvar et al. |
| 2007/0283019 A1 | 12/2007 | Funahashi |
| 2008/0016210 A1* | 1/2008 | Maekawa ............. H04L 41/026 709/224 |
| 2008/0052724 A1 | 2/2008 | Numata |
| 2009/0150546 A1 | 6/2009 | Ryan |
| 2009/0284783 A1 | 11/2009 | Kaneda |
| 2009/0310787 A1* | 12/2009 | Nishimi ................ G06F 21/335 380/277 |

FOREIGN PATENT DOCUMENTS

| | | |
|---|---|---|
| JP | 2003-157275 A | 5/2003 |
| JP | 2005-157612 A | 6/2005 |
| JP | 2007-249675 A | 9/2007 |
| JP | 2009-146358 A | 7/2009 |

OTHER PUBLICATIONS

Japanese Office Action issued in corresponding application No. 2009-288826 dated Oct. 8, 2013.
Japanese Office Action issued in corresponding application No. 2009-288826 dated Jul. 1, 2014.
European Office Action issued in corresponding application No. 10191696.3 dated Mar. 12, 2015.
Chinese Office Action dated Jul. 5, 2012 for Chinese corresponding application No. 201010554739.9.

* cited by examiner

SELECT NETWORK DEVICE 40, AND PRESS "CONFIRM WAY OF COPING"

INFORMATION PROCESSING APPARATUS, METHOD FOR CONTROLLING INFORMATION PROCESSING APPARATUS, AND STORAGE MEDIUM

CROSS REFERENCE TO RELATED APPLICATIONS

This application is a continuation of U.S. patent application Ser. No. 12/971,445, filed on Dec. 17, 2010, which claims priority to Japanese Patent Application No. 2009-288826, filed on Dec. 21, 2009, the disclosures of each of which are hereby incorporated by reference herein in their entirety.

BACKGROUND OF THE INVENTION

Field of the Invention

The present invention relates to an information processing apparatus capable of communicating with a device via a network, a method for controlling the information processing apparatus, and a storage medium storing a program.

Description of the Related Art

A device, such as a multifunction peripheral, provides various functions such as printing, copying, scanning, and facsimile functions. In order for a user to use the functions, setting required for each of the functions is to be previously made for the device. In order to use a function of attaching image data obtained by scanning in a device as an attached file to an electronic mail and sending the image data attached to the electronic mail to an apparatus on a network, for example, a mail server is to be previously set for the device.

In order to simplify the setting, a technique for enabling various types of setting for a device has been known, in which the device has a Web server function to generate a webpage for performing the various types of setting and operates a web browser included in a personal computer (PC) on a network (e.g., Japanese Patent Application Laid-Open No. 2002-7095).

The above-mentioned conventional technique is convenient because a user can operate his/her own PC to perform initialization required for the device. However, the webpage is usually identified uniquely by a uniform resource locator (URL). In order for the user to display a desired webpage via a web browser, therefore, the user needs to know a URL of the webpage. Alternatively, in order for the user to reach a desired webpage after displaying a particular webpage (e.g., a front page), the user needs to follow several links and search for the webpage. Further, when the user does not find out what initialization is to be performed for a function which it desires to use, the user cannot reach a webpage for the setting.

The above-mentioned conventional technique is not necessarily easy to use for a user who does not know much about a setting required for a function provided by the device or a user who is unfamiliar with an operation of the web browser.

SUMMARY OF THE INVENTION

The present invention is directed to enabling simple access to the webpage for setting a function desired by a user out of webpages provided by a device.

According to an aspect of the present invention, an information processing apparatus includes a display control unit, a generation unit, and a notification unit. The display control unit displays a device for executing a particular function on a display device. The displayed device includes separate webpages and the separate webpages include a webpage for setting to make the particular function usable. In response to a user selecting the device displayed on the display device, the generation unit generates a uniform resource locator (URL). The generated URL represents the webpage for setting to make the particular function usable. The notification unit notifies the URL generated by the generation unit to a web browser included in the information processing apparatus.

According to another aspect of the present invention, an information processing apparatus includes a display control unit, a generation unit, and an acquisition unit. The display control unit displays a device for executing a particular function on a display device. The displayed device includes separate webpages and the separate webpages include a webpage for setting to make the particular function usable. In response to a user selecting the device displayed on the display device, the generation unit generates a URL. The generated URL represents the webpage for setting to make the particular function usable. The acquisition unit accesses the URL generated by the generation unit to acquire a webpage corresponding to the URL. The display control unit displays the webpage acquired by the acquisition unit on the display device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
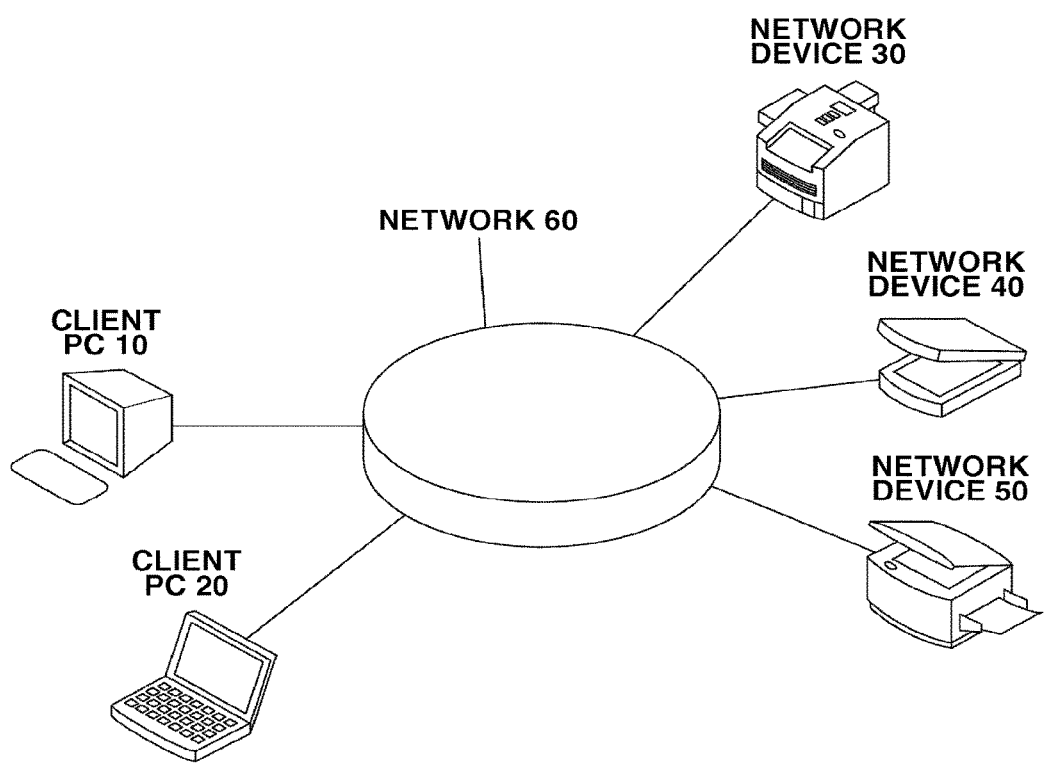
FIG. 1 illustrates a configuration of a network system according to the present exemplary embodiment.

FIG. 1 illustrates a configuration of a network system according to a first exemplary embodiment. The network system illustrated in FIG. 1 includes client PCs 10 and 20, and network devices 30, 40, and 50. Each of the client PCs 10 and 20 and each of the network devices 30, 40, and 50 can communicate with each other via a network 60. Each of the client PCs 10 and 20 is an information processing apparatus such as a personal computer or a mobile phone. Each of the network devices 30, 40, and 50 may be a printer, a scanner, a copying machine, a multifunction peripheral, or the like including a Web server function for generating a webpage and providing the webpage to a web browser, or may be an audio visual (AV) apparatus such as a television or a video and an apparatus such as a router. The network 60 may be a local area network (LA), a wide area network (WAN), or a wireless network. The webpage (or web page) may be a document or resource of information that is suitable for the network 60 and can be accessed through a web browser and displayed on a computer screen. A uniform resource locator (URL) may include a unique string of characters that represents the location or address of a resource on a network and how that resource should be accessed. In that way, the URL may represent the webpage.

In the present exemplary embodiment, a product name of the network device 30 and the network device 40 is "AAA", and a product name of the network device 50 is "BBB". The product name is given for each apparatus type by a manufacturer, and cannot be changed by a user. On the other hand, "NETWORK DEVICE 30", "NETWORK DEVICE 40", and "NETWORK DEVICE 50" are device names that can be optionally set.

In the present exemplary embodiment, all the network devices 30, 40, and 50 have an electronic mail sending function. The electronic mail sending function is a function of attaching data held by the network device to an electronic mail and sending the data attached to the electronic mail to a network. The data attached to the electronic mail to be sent include image data generated by a scanner included in a network device and image data previously stored in a storage unit included in the network device, and various types of data.

Figure 2:
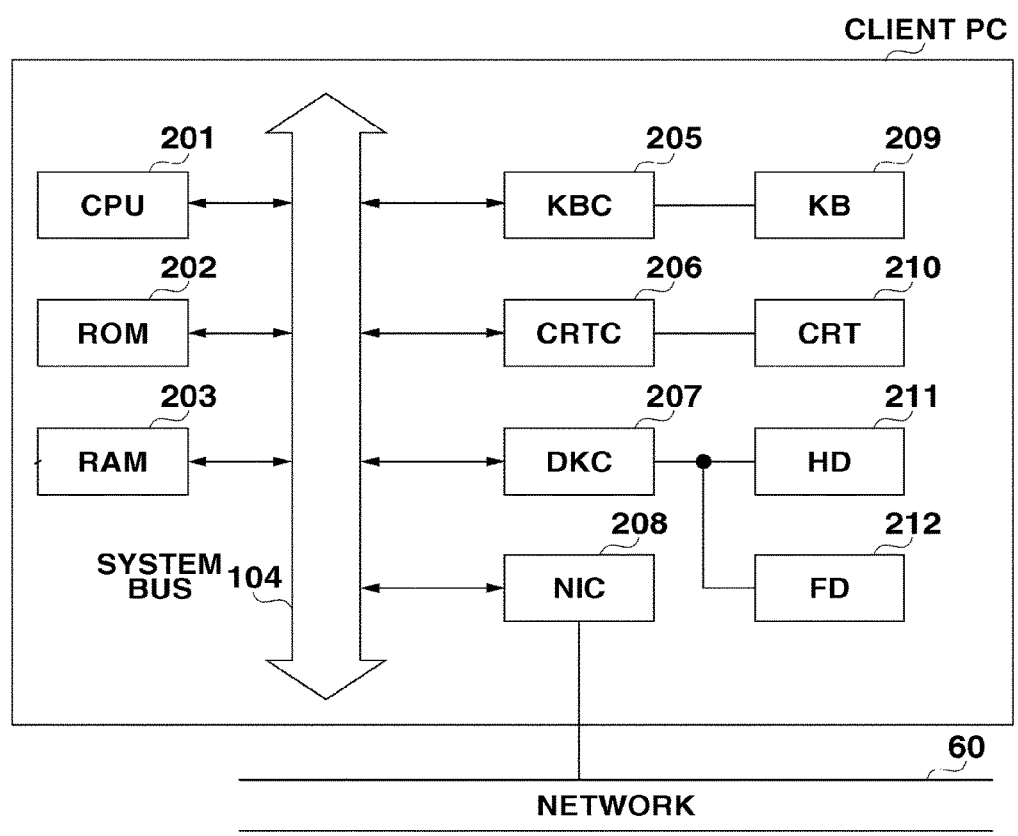
FIG. 2 illustrates a hardware configuration of a client PC in the present exemplary embodiment.

FIG. 2 illustrates a hardware configuration of the client PCs 10 and 20 (hereinafter collectively referred to as a client PC) in the present exemplary embodiment. The client PC includes a central processing unit (CPU) 201 for executing a program stored in a read-only memory (ROM) 202 or a hard disk (HD) 211 or supplied from a floppy (trade mark) disk drive (FD) 212 or in a compact disk (CD)-ROM or a digital versatile disk (DVD)-ROM (not illustrated).

A random access memory (RAM) 203 functions as a main memory, a work area, or the like in the CPU 201. A keyboard controller (KBC) 205 controls an instruction input from a keyboard (KB) 209 or a pointing device (not illustrated). A cathode ray tube controller (CRTC) 206 controls display on a cathode ray tube (CRT) display 210 serving as a display device. A disk controller (DKC) 207 controls access to the HD 211, and the FD 212 or a CD-ROM or a DVD-ROM (not illustrated) storing a boot program, various applications, a predetermined file, and so on. A network interface card (NIC) 208 bi-directionally exchanges data with the network device via the network 60.

Figure 3:
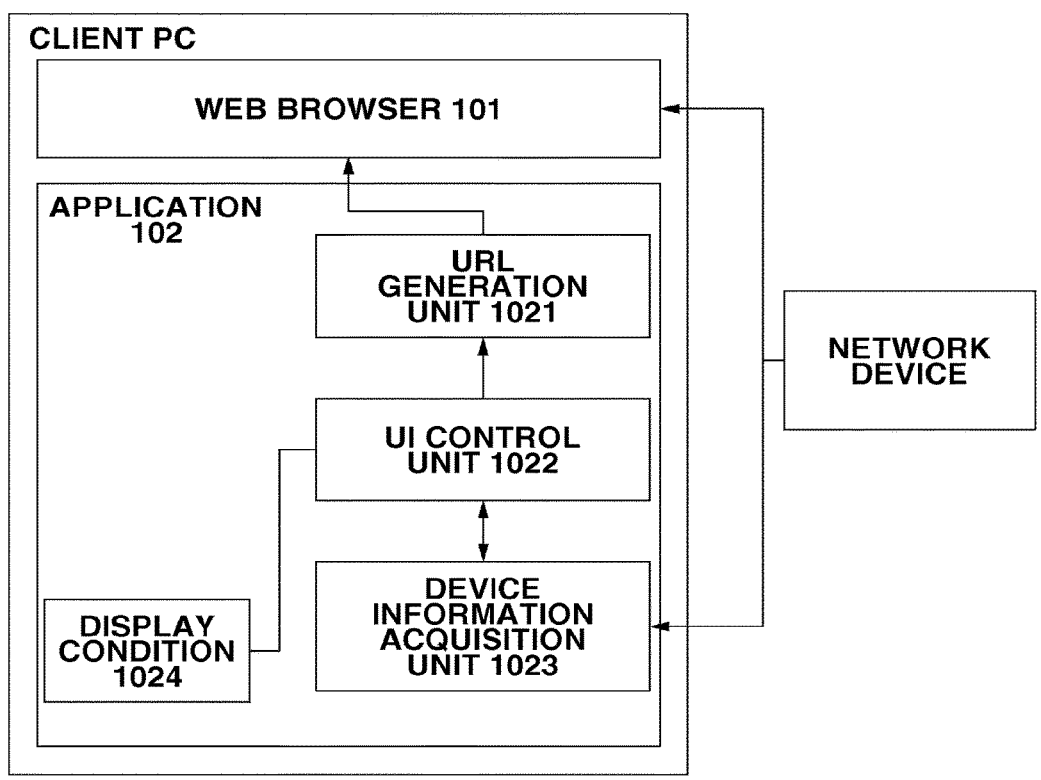
FIG. 3 illustrates a software configuration of a client PC in the present exemplary embodiment.

FIG. 3 illustrates a configuration of software stored in a storage unit (the ROM 202 or the HD 211) included in the client PC according to the present exemplary embodiment. The client PC in the present exemplary embodiment includes a web browser 101 having a function of accessing a Web server, acquiring a webpage, and displaying the webpage on a display unit (the CRT display 210). The client PC further includes an application 102. The application 102 includes a URL generation unit 1021, a user interface (UI) control unit (display control unit) 1022, a device information acquisition unit 1023, and a display condition 1024, and executes processing described below. In the present exemplary embodiment, the application 102 is used to make a user set an electronic mail sending function out of functions of the network device. The application 102 is stored in a CD-ROM, a DVD-ROM, a floppy (trade mark) disk, or the like, supplied to the client PC, and installed into the client PC by the DKC 207 to be executed. Alternatively, the application 102 may be acquired from an external apparatus via the network 60.

Figure 4:
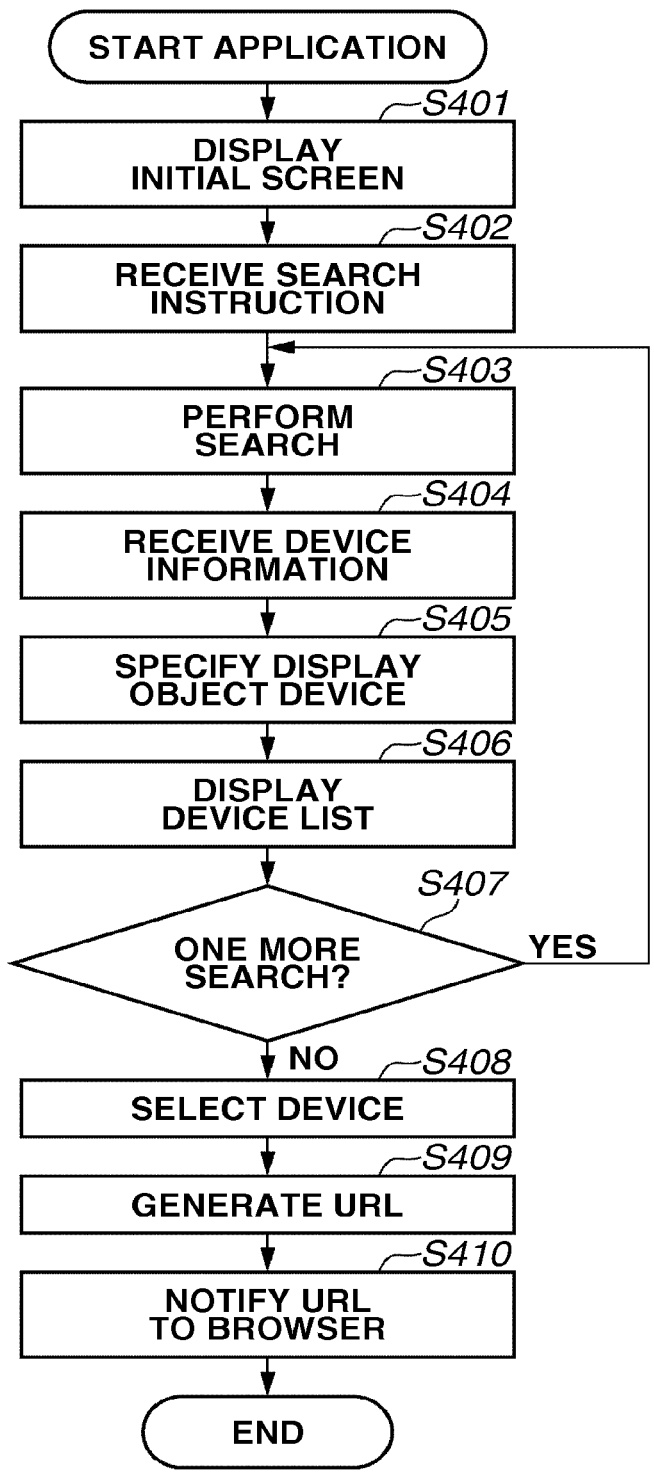
FIG. 4 is a processing flow of an application in a client PC in the present exemplary embodiment.

The processing executed by the application 102 included in the client PC in the present exemplary embodiment will be described with reference to FIG. 4. Processes illustrated in FIG. 4 are performed by the CPU 201 executing a program for the application 102 stored in the client PC.

When the application 102 is started in the client PC, then in step S401, the CPU 201 displays an initial screen of the application 102 on the display unit (CRT display 210). The displayed initial screen indicates that the application 102 is used to make a setting for making an electronic mail sending function usable, or display notes for use. When the user selects a particular button in the initial screen, the CPU 201 can start to search for a network device. If the user selects the particular button, the processing proceeds to step S402. In step S402, the CPU 201 receives an instruction to start to search for a network device. In step S403, the CPU 201 performs the search. More specifically, the client PC sends a search request packet requesting a network device connected to the network 60 to send in response its device information based on a predetermined protocol. The search request packet may be sent using a broadcast or a multicast, or may be sent, if an Internet protocol (IP) address of a desired network device (identification information in the network 60) is known, using a unicast performed by designating the IP address. The network device that has received the search request packet sends its own device information toward the client PC. The device information sent at this time includes a device name, a product name, an IP address, an installation location, and so on. In the present exemplary embodiment, a device name "NETWORK DEVICE 30", a product name "AAA", etc. are sent from the network device 30. A device name "NETWORK DEVICE 40", a product name "AAA", etc. are sent from the network device 40. A device name "NETWORK DEVICE 50", a product name "BBB", etc. are sent from the network device 50. The sent device information may include other information such as information representing a function of a network device and state information.

In step S404, the device information acquisition unit 1023 receives the device information sent from the network device as a response to the search request packet. In step S405, the CPU 201 then compares the received device information with the display condition 1024, to specify a device to be displayed (a display object device) as a search result. In the present exemplary embodiment, some products have a webpage for setting to make an electronic mail sending function usable (hereinafter referred to as a webpage for setting an electronic mail sending function), while other products do not. A product with the product name "AAA" has the webpage for setting an electronic mail sending function, and a product with the product name "BBB" does not have the webpage for setting an electronic mail sending function. This information is held in the display condition 1024. More specifically, the product name (product name "AAA") of the product having the webpage for setting an electronic mail sending function is held in the display condition 1024. In step S405, the CPU 201 compares the product name included in the received device information with the product name held in the display condition 1024, to specify, if they match each other, the network device having the product name as a display object device.

More specifically, only the network device having the webpage for setting an electronic mail sending function is specified as a display object device. In the present exemplary embodiment, the network device 30 and the network device 40 are specified as devices for display.

Figure 5:
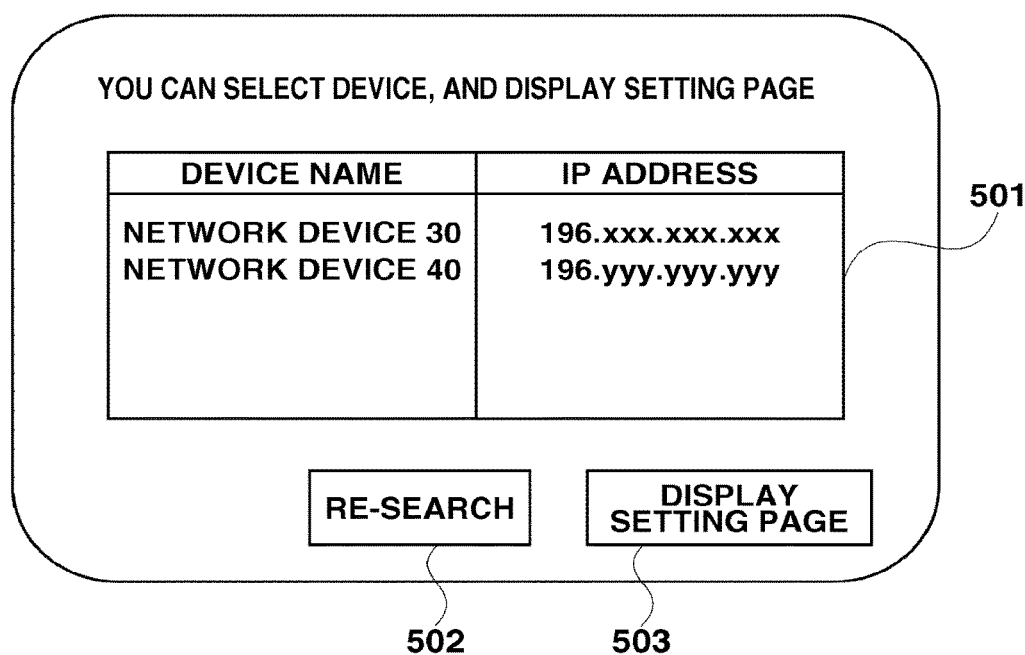
FIG. 5 illustrates an example of a display screen in a first exemplary embodiment.

In step S406, the UI control unit 1022 displays a screen on which the network devices specified in step S405 are displayed as a list on the display unit. FIG. 5 illustrates an example of a list display screen displayed at this time. In an example illustrated in FIG. 5, respective device names and IP addresses of the network device 30 and the network device 40 are displayed as a list on a screen 501, and a re-search button 502 is displayed. In step S407, the CPU 201 determines whether the re-search button 502 is pressed. If the re-search button 502 is pressed (YES in step S407), the processing returns to step S403. In step S403, the CPU 201 can search for a network device again.

In step S408, the CPU 201 is responsive to the user who selects any network device from the list display screen, and then presses a "DISPLAY SETTING PAGE" button 503 to specify the network device selected by the user. In step S409, the URL generation unit 1021 generates an URL for accessing "a webpage for setting an electronic mail sending function" of the network device based on an IP address of the network device specified in step S408. More specifically, the URL generation unit 1021 adds predetermined path information "email_setting" to the IP address of the specified network device. Thus, a URL "http://<IP address>/email_setting.html" is generated. In step S410, the CPU 201 notifies (e.g., transmits, sends) the generated URL to the web browser 101, and requests the web browser to access the URL. While as a rule for generating a URL, predetermined path information is added in this example, a predetermined port number may also be added, for example. When the above-mentioned processes are performed, the processing of the application 102 is terminated.

Then, the web browser 101 in the client PC accesses the URL notified in step S410, acquires a webpage from a network device corresponding to the notified URL, and displays the webpage on the display unit. More specifically, a webpage for setting an electronic mail sending function is displayed in the client PC. The webpage for setting an electronic mail sending function includes an entry field of a mail server such as a simple mail transfer protocol (SMTP) server or a setting entry field for SMTP authentication, and an editing field for an address book of destination electronic mail addresses. The user can perform desired setting from the webpage for setting an electronic mail sending function by operating the web browser 101 in the client PC.

In the present exemplary embodiment, only by starting the application 102 and selecting, out of network devices searched for, the desired network device, a webpage for setting to be performed for the network device is automatically displayed. Therefore, in setting an electronic mail sending function of a network device, the user is not required to know a URL of the webpage for setting in advance. Alternatively, the user is not required to display a front page (or any page) of a webpage provided by the network device using a web browser, and then follow a link, to search for a webpage for setting an electronic mail sending function.

In the first exemplary embodiment, a network device has a webpage for setting a particular function, for example, a webpage for setting an electronic mail sending function. In a second exemplary embodiment, a network device has separate webpages for respectively setting a plurality of functions. A difference from the first exemplary embodiment will be described below.

In the second exemplary embodiment, a device name and a product name of a network device 30 in a network system illustrated in FIG. 1 are respectively "NETWORK DEVICE 30" and "XXX". A product with the product name XXX has a webpage for setting a copying function, a webpage for setting an electronic mail sending function, and a webpage for setting a facsimile function. A device name and a product name of a network device 40 in the network system illustrated in FIG. 1 are respectively "NETWORK DEVICE 40" and "YYY". A product with the product name YYY has a webpage for setting a copying function, a webpage for setting an electronic mail sending function, and a webpage for setting a facsimile function. A device name and a product name of a network device 50 in the network system illustrated in FIG. 1 are respectively "NETWORK DEVICE 50" and "ZZZ". A product with the product name ZZZ has a webpage for setting a copying function and does not have a webpage for setting an electronic mail sending function and a webpage for setting a facsimile function.

In the second exemplary embodiment, an application 102 included in a client PC also performs processing according to the flowchart illustrated in FIG. 4 in the first exemplary embodiment. In the second exemplary embodiment, a list display screen displayed in step S406 is a screen illustrated in FIG. 6. More specifically, a "COPY" button 601, an "Email" button 602, and a "FAX" button 603 (functional buttons) are displayed. Responsive to a user selecting any one of the buttons, network devices displayed in a list display area 604 are switched to only a network device having a webpage for setting a function corresponding to the selected button.

Figure 6:
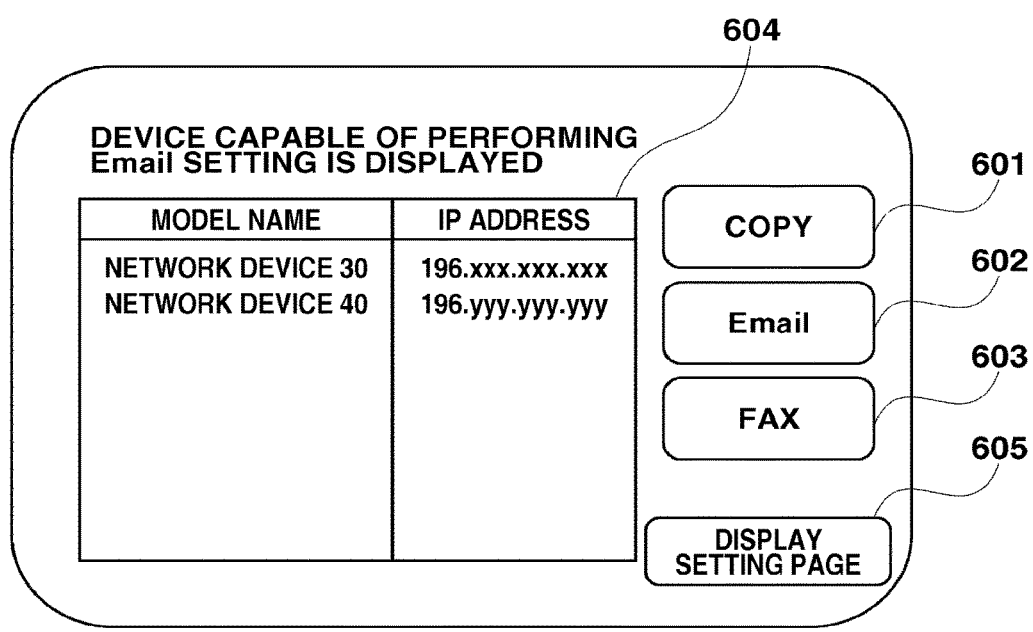
FIG. 6 illustrates an example of a display screen in a second exemplary embodiment.

More specifically, in the second exemplary embodiment, every time any one of the buttons (functional buttons) 601 to 603 is pressed, a process in step S405 illustrated in FIG. 4 is performed. When the COPY button 601 is pressed, for example, the CPU 201 refers to a display condition 1024, to identify names of products having a webpage for setting a copying function as XXX, YYY, and ZZZ. The product names are compared with a product name included in device information acquired from each of network devices, to specify the network device as a display object device. FIG. 6 illustrates an example of a screen displayed when a user presses the "Email" button 602. On this screen, only the network devices 30 and 40 respectively corresponding to the product names XXX and YYY each having a webpage for setting an electronic mail sending function are displayed as a list.

When the user selects either one of the network devices, and presses a "DISPLAY SETTING PAGE" button 605, a URL generation unit 1021 generates a URL. In the second exemplary embodiment, different URLs are generated depending on the functions selected by the functional buttons. If the "COPY" button 601 is selected, for example, predetermined path information "copy_setting" is added to an IP address, to generate a URL "http://<IP address>/copy_setting.html". If the "Email" button 602 is selected, predetermined path information "email_setting" is added to an IP address, to generate a URL "http://<IP address>/email_setting.html". If the FAX button 603 is selected, predetermined path information "fax_setting" is added to an IP address, to generate a URL "http://<IP address>/fax_setting.html".

If each of the network devices has webpages for respectively setting a plurality of functions, the network devices are displayed as a list for each of the functions so that the network device not having the webpage for setting the function is not erroneously selected. Even if the same network device has webpages for setting by URLs that differ depending on functions, the URLs are automatically generated to correspond to the webpages for setting. Therefore, the user can simply browse a desired webpage.

In the above-mentioned example, the functional buttons 601 to 603 are provided in a search result list screen and a network device has separate webpages for respectively setting a plurality of functions. Every time the functional button is selected, network devices displayed as a list are correspondingly changed. However, another method can also be used.

Figure 7A:
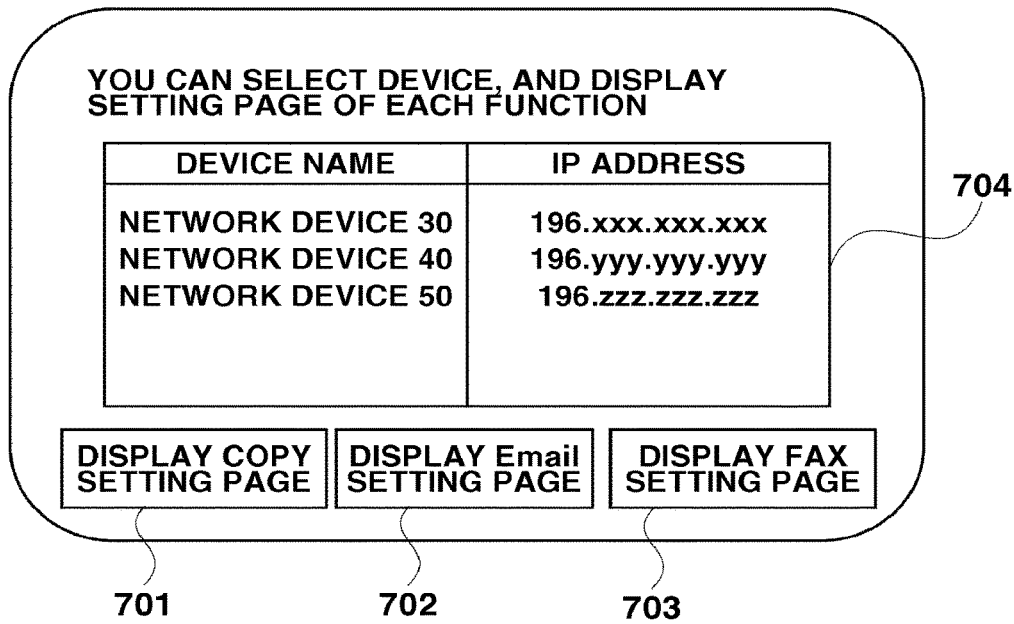
FIGS. 7A and 7B illustrate an example of a display screen in a third exemplary embodiment.
Figure 7B:
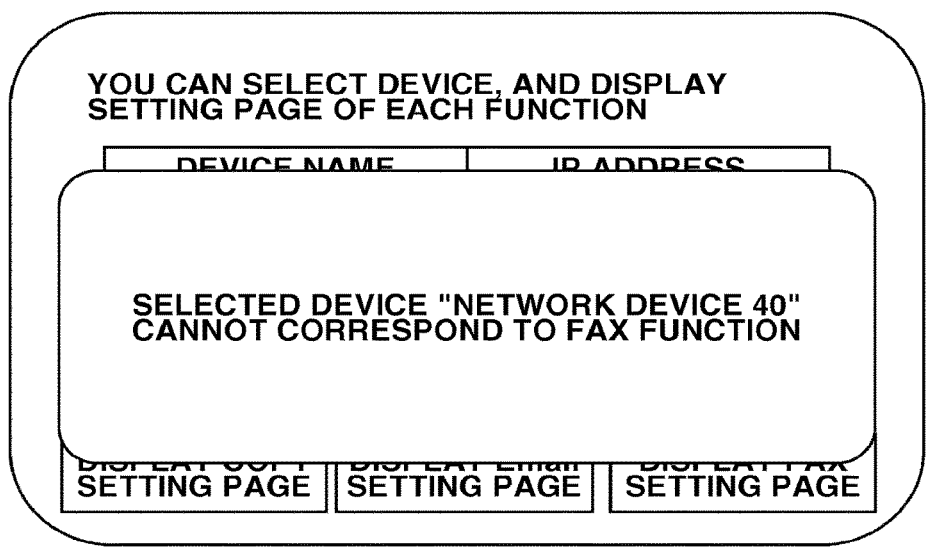

FIG. 7A illustrates an example of display using a method other than that illustrated in FIG. 6 for a case where a network device has separate webpages for respectively setting a plurality of functions. In the example illustrated in FIG. 7, setting page specifying buttons 701 to 703 are provided instead of the functional buttons 601 to 603 on a screen displayed in step S406. All network devices 30 to 50 are displayed in a list display area 704. When a user selects any one of the network devices, and selects any one of the setting page specifying buttons 701 to 703, a CPU 201 determines whether the selected network device has a selected webpage for setting. If it is determined that the selected device has the selected webpage for setting, a URL generation unit 1021 generates a URL. A generation method at this time is as described above. On the other hand, if it is determined that the selected network device does not have the selected webpage for setting, a screen illustrated in FIG. 7B is displayed. The screen illustrated in FIG. 7B is displayed to notify the user that the selected network device does not have the selected webpage for setting. FIG. 7 illustrates an example in which the user selects the network device 40 on the screen illustrated in FIG. 7A, and presses the "DISPLAY FAX SETTING PAGE" button 703. Since the network device 40 does not have the webpage for setting a facsimile function, as described above, the screen illustrated in FIG. 7B is displayed to notify the user that the network device 40 does not have the webpage for setting a facsimile function. The determination in this case is made by comparing information relating to a product name held in the display condition 1024 with a product name in device information received from each of the network devices.

In either one of the above-mentioned exemplary embodiments, a network device has a webpage for setting to make a function usable, and a client PC simply accesses the webpage. In a third exemplary embodiment, a network device has a webpage for error information, which indicates a way to cope with an error, in addition to the first and second exemplary embodiments. Differences from the first and second exemplary embodiments will be described below.

In the present exemplary embodiment, product names of a network device 30 and a network device 40 are "AAA", and a product name of a network device 50 is "BBB". Device names of the network devices 30, 40, and 50 are respectively "NETWORK DEVICE 30", "NETWORK DEVICE 40", and "NETWORK DEVICE 50". A product with the product name AAA has a webpage for error information, and a product with the product name BBB has no webpage for error information.

Also in the present exemplary embodiment, a client PC searches for a network device according to the flowchart illustrated in FIG. 4. In the present exemplary embodiment, device information received from a network device in step S404 includes error information indicating that an error currently occurs in the network device. The error information includes information as to whether an error occurs and an error code serving as information for specifying the occurring error.

When a CPU 201 in the client PC receives device information including error information, it specifies, out of devices that have responded to a search, the device having an error occurring therein and having a webpage for error information. The specified device is a device for display. The CPU 201 determines whether a network device has a webpage for error information, by using information relating to a product name held in a display condition 1024. In the present exemplary embodiment, the display condition 1024 holds a product name of a product having a webpage for error information.

In the present exemplary embodiment, if no error occurs in the network device 30 and errors occur in the network devices 40 and 50, then in step S405, only the network device 40 is specified as the device for display. The network device 30 has no error occurring therein, and the network device 50 has an error occurring therein but has no webpage for error information.

Figure 8A:
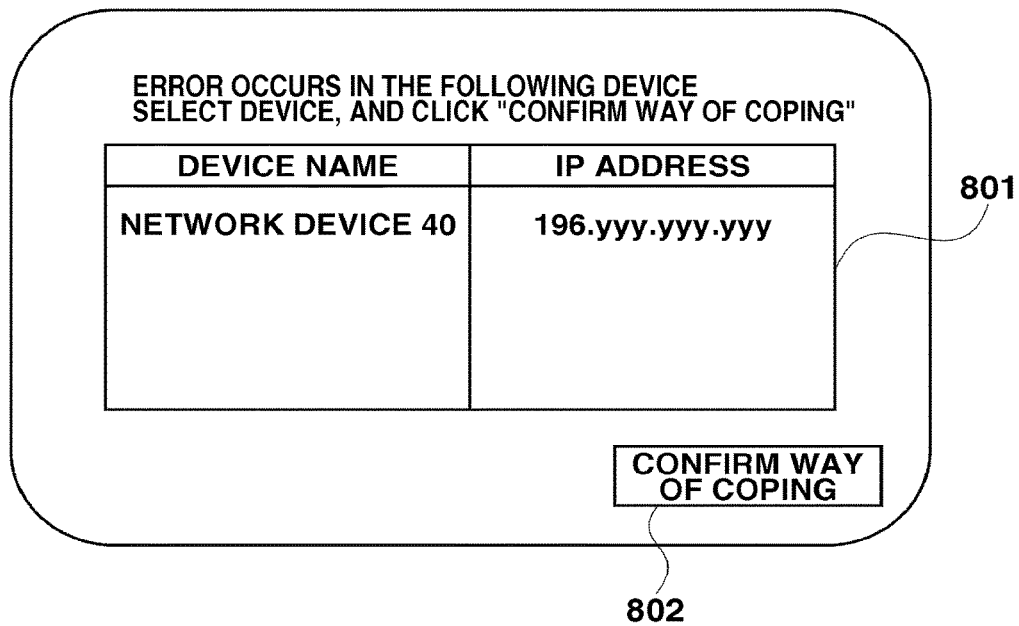
FIGS. 8A and 8B illustrate a display screen in a fourth exemplary embodiment.
Figure 8A:
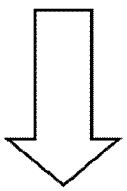
Figure 8B:
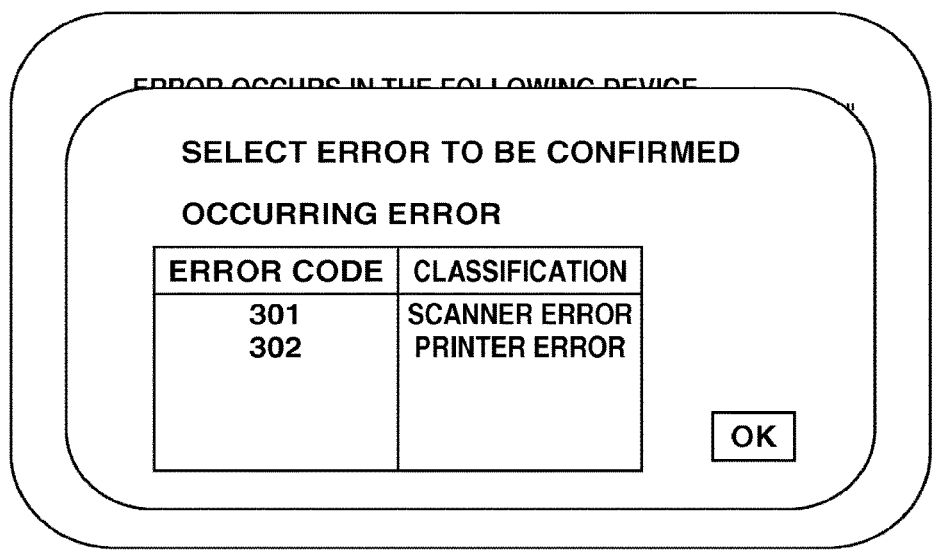

FIG. 8A illustrates an example of a screen displayed on a client PC which an application 102 processes in the present exemplary embodiment. As described above, network devices having an error currently occurring therein and having a webpage for error information are each displayed in a list display area 801. When a user selects any one of the network devices, and presses a "CONFIRM WAY OF COPING" BUTTON 802, a screen illustrated in FIG. 8B is displayed. On the screen illustrated in FIG. 8B, contents (an error code and classification) of errors currently occurring in the network device selected in FIG. 8A are displayed. While confirming the display, the user can select the error as to which the user desires to know a way of coping with it. When any one of the errors is selected on the screen illustrated in FIG. 8B, and an OK button is pressed, an URL generation unit 1021 generates a URL for accessing a webpage for error information corresponding to the error. When the number of errors that occur is only one, the display illustrated in FIG. 8B may be omitted, generation of a URL may be started in response to the button 802 being pressed.

The URL generation unit 1021 adds predetermined path information "error" to an IP address of a specified network device, to generate a URL "http://<IP address>/error.html". The generated URL is notified to a web browser 101, and the web browser 101 is requested to access the URL. When a webpage for error information is changed for each error code, path information "error/<error code>" may be added, to generate a URL "http://<IP address>/error/301.html", for example.

The web browser 101 that was notified of the URL accesses the URL, to acquire a webpage for error information from a network device and display the webpage for error information. When an error occurs in the network device, therefore, the user can confirm a content of the error and a way to cope with the error using a web browser in the client PC. This eliminates the needs to know a URL of a webpage in advance and follow a link to search for the webpage.

The above-mentioned first to third exemplary embodiments can be optionally combined with one another. The present invention is not limited to the above-mentioned exemplary embodiments, and various modifications can be made. In the above-mentioned exemplary embodiments, determination as to whether each of the network devices has a particular webpage is made depending on a product name. More specifically, the determination is made based on information as to whether the display condition 1024 in the application 102 holds a product name of a product having a particular webpage in advance. However, device information acquired from a device as a response to a search may include information as to whether a product has a particular webpage. Alternatively, only a network device having a particular webpage as a search condition in performing a search may respond to the search.

While the application 102 itself is provided as software having no function of a web browser 101 in the above-mentioned exemplary embodiments, the application 102 may have a function of the web browser 101. More specifically, the application 102 may acquire a webpage using a URL generated by the URL generation unit 1021. The application 102 may analyze the acquired webpage (e.g., a Hypertext Makeup Language (HTML) file) and display the webpage on a display unit included in the client PC. Thus, a similar function to those in the above-mentioned exemplary embodiments can be achieved even in a client PC including no web browser 101.

While a noncompliant network device is not displayed on the search result display screens illustrated in FIGS. 5 to 8, the noncompliant network device may be made unselectable, although displayed. Alternatively, the noncompliant network device maybe displayed in gray-out. In the case, the user can notice the existence of the network device.

Further, on the search result display screens illustrated in FIGS. 5 to 8, a network device in which a particular function has been set maybe exempted from a display object device. Thus, the user can be prevented from erroneously selecting a network device in which a particular function has already been set. Particularly when the same device name has been registered in a plurality of network devices, the user easily selects the desired network device (in which a particular function has not been set yet).

While a function corresponding to a webpage for setting include an electronic mail sending function, a copying function, and a facsimile function as an example, other functions may be similarly used. The other functions include a file transfer protocol (FTP) sending function, a server message block (SMB) sending function, an Internet facsimile (IFAX) sending function, a printing function, and a scanning function.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may have stored thereon, a program that causes information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A display method for displaying a web page for inputting a setting required for using an email function of a network device on a web browser of an information processing apparatus capable of communicating with the network device, the display method comprising:
   searching for a network device capable of communicating with the information processing apparatus via a network;
   displaying one or more network devices searched for in the searching;
   selecting a network device from the one or more network devices displayed in the displaying;
   generating a uniform resource locator (URL) at least including an internet protocol (IP) address of the network device selected in the selecting, the IP address being obtained from the network device after the searching is started; and
   notifying the web browser of the URL generated in the generating,
   wherein the web browser obtains, based on the URL, information about a web page for inputting a setting required for using an email function of the selected network device, from the selected network device, and displays the web page based on the obtained information.

2. The display method according to claim 1, wherein the URL includes the IP address obtained from the network device and predetermined information.

3. The display method according to claim 2, wherein the predetermined information is pass information or a port number.

4. The display method according to claim 1, wherein the setting required for using the email function is one or more of information related to an E-mail server, information related to an SMTP authentication, and information related to a destination E-mail address.

5. The display method according to claim 1, wherein the searching is executed according to a user instruction.

6. The display method according to claim 1, further comprising obtaining the IP address from the network device capable of communicating with the information processing apparatus as a search result of the searching.

7. The display method according to claim 1, further comprising specifying, based on the IP address obtained in the obtaining, the one or more network devices to be displayed in the displaying.

8. The display method according to claim 7, wherein, in the specifying, the one or more network devices to be displayed in the displaying is specified based on a product name of the network device obtained in the obtaining.

9. The display method according to claim 1, wherein, in the displaying, both a device name of a network device and an IP address of the network device are displayed.

10. The display method according to claim 1, wherein, in the generating, the URL is generated according to the network device having been selected in the selecting.

11. A non-transitory storage medium that stores an application program for displaying a web page for inputting a setting required for using an email function of a network device on a web browser of an information processing apparatus capable of communicating with the network device, the application program comprising:

a search code for searching for a network device capable of communicating with the information processing apparatus via a network;
a display code for displaying searched—for one or more network devices;
a selection code for selecting a network device from the displayed one or more network devices;
a generation code for generating a uniform resource locator (URL) at least including an internet protocol (IP) address of the selected network device, the IP address being obtained from the network device after the searching is started; and
a notification code for notifying the web browser of the generated URL.

12. The non-transitory storage medium according to claim 11, wherein the URL includes the IP address obtained from the network device and predetermined information.

13. The non-transitory storage medium according to claim 12, wherein the predetermined information is pass information or a port number.

14. The non-transitory storage medium according to claim 11, wherein the setting required for using the email function is one or more of information related to an E-mail server, information related to an SMTP authentication, and information related to a destination E-mail address.

15. The non-transitory storage medium according to claim 11, wherein the search code is executed according to a user instruction.

16. The non-transitory storage medium according to claim 11, wherein the application program further comprises an obtaining code for obtaining the IP address from the network device capable of communicating with the information processing apparatus.

17. The non-transitory storage medium according to claim 11, wherein the application program further comprises a specifying code for specifying, based on the obtained IP address, the one or more network devices to be displayed.

18. The non-transitory storage medium according to claim 17, wherein the specifying code is a code for specifying the one or more network devices to be displayed by the displaying code based on a product name of the network device obtained by the obtaining code.

19. The non-transitory storage medium according to claim 11, wherein the displaying code is a code for displaying both a device name of a network device and an IP address of the network device.

20. The non-transitory storage medium according to claim 11, wherein the generation code is executed according to the network device having been selected.

21. An information processing apparatus for displaying, on a web browser, a web page for inputting a setting required for using a network device, the information processing apparatus comprising:
a network interface configured to transmit a search packet for searching for a network device capable of communicating with the information processing apparatus via a network;
a display configured to display one or more network devices having responded to the search packet; and
a processor configured to generate a uniform resource locator (URL) at least including an internet protocol (IP) address of a network device selected by a user from the one or more network devices displayed by the display, and to notify the web browser of the generated URL, the IP address being obtained from the network device after the searching is started,
wherein the web browser obtains, based on the URL, information about a web page for inputting a setting required for using an email function of the selected network device, from the selected network device, and displays the web page based on the obtained information.

22. A display method for displaying a web page for inputting a setting required for using an email function of a network device on a web browser of an information processing apparatus capable of communicating with the network device, the display method comprising:
searching for a network device capable of communicating with the information processing apparatus via a network;
displaying one or more network devices searched for in the searching;
selecting a network device from the one or more network devices displayed in the displaying;
generating a uniform resource locator (URL) at least including an internet protocol (IP) address of the network device selected in the selecting, the IP address being obtained from the network device after the searching is started; and
notifying the web browser of the URL generated in the generating.

23. display method according to claim 22, wherein the URL includes the IP address obtained from the network device and predetermined information.

24. The display method according to claim 23, wherein the predetermined information is pass information or a port number.

25. The display method according to claim 22, wherein the setting required for using the email function is one or more of information related to an E-mail server, information related to an SMTP authentication, and information related to a destination E-mail address.

26. The display method according to claim 22, wherein the searching is executed according to a user instruction.

27. The display method according to claim 22, further comprising obtaining the IP address from the network device capable of communicating with the information processing apparatus as a search result of the searching.

28. The display method according to claim 22, further comprising specifying, based on the IP address obtained in the obtaining, the one or more network devices to be displayed in the displaying.

29. The display method according to claim 28, wherein, in the specifying, the one or more network devices to be displayed in the displaying is specified based on a product name of the network device obtained in the obtaining.

30. The display method according to claim 22, wherein, in the displaying, a device name of a network device and an IP address of the network device are both displayed.

31. The display method according to claim 22, wherein, in the generating, the URL is generated according to the network device having been selected in the selecting.

32. An information processing apparatus for displaying, on a web browser, a web page for inputting a setting required for using a network device, the information processing apparatus comprising:
a network interface configured to transmit a search packet for searching for a network device capable of communicating with the information processing apparatus via a network;
a display configured to display one or more network devices having responded to the search packet; and a processor configured to generate a uniform resource locator (URL) at least including an internet protocol (IP) address of a network device selected by a user from the one or more network devices displayed by the display, and to notify the web browser of the generated URL, the IP address being obtained from the network device after the searching is started.

* * * * *